United States Patent [19]
Jochum et al.

[11] Patent Number: 5,926,384
[45] Date of Patent: Jul. 20, 1999

[54] DC-DC CONVERTER HAVING DYNAMIC REGULATOR WITH CURRENT SOURCING AND SINKING MEANS

[75] Inventors: Thomas Andrew Jochum, Durham; Michael Mark Walters, Raleigh; Charles Edward Hawkes, Cary; Matthew Harris, Raleigh, all of N.C.

[73] Assignee: Harris Corporation, Palm Bay, Fla.

[21] Appl. No.: 08/883,624

[22] Filed: Jun. 26, 1997

[51] Int. Cl.$^6$ ................................................. H02M 3/315
[52] U.S. Cl. .................... 363/56; 363/39; 361/90
[58] Field of Search ................... 363/39, 50, 56; 361/111, 90, 92, 118, 78

[56] References Cited

U.S. PATENT DOCUMENTS

| | | | |
|---|---|---|---|
| 4,245,270 | 1/1981 | Busby | 361/111 |
| 5,262,680 | 11/1993 | Hu | 361/21 |
| 5,448,441 | 9/1995 | Raposa | 361/90 |
| 5,502,370 | 3/1996 | Hall et al. | 363/21 |
| 5,528,167 | 6/1996 | Samela et al. | 326/30 |
| 5,539,910 | 7/1996 | Brueckmann et al. | 361/92 |

*Primary Examiner*—Robert E. Nappi
*Assistant Examiner*—Derek J. Jardieu
*Attorney, Agent, or Firm*—Allen, Dyer, Doppelt, Milbrath & Gilchrist, P.A.

[57] ABSTRACT

An electronic circuit includes a dynamic regulator connected to a load and a dc-to-dc converter to reduce a need for bulky and expensive capacitors which would otherwise be required to suppress transients. The dynamic regulator comprises one or both of a current source circuit for actively sourcing current to the load during load current demand transients, and a current sink circuit for actively sinking current from the load during load current excess transients. The dynamic regulator preferably senses the load voltage, and tracks the load voltage. The current source circuit preferably includes a current source switch, and a current source controller for operating the current source switch responsive to the load voltage falling rapidly with respect to the tracked load voltage. In a similar fashion, the current sinking circuit may include a current sink switch, and a current sink controller for operating the current source switch responsive to the load voltage rising quickly above the tracked load voltage. In one embodiment, the load voltage tracking may be provided by a resistor-capacitor (R/C) network connected across the load. The R/C network may operate at a fast time constant for following load ripple, but at a slower time constant when sourcing or sinking current. The dynamic regulator is preferably a monolithic integrated circuit and may be either separate from or incorporated into the dc-to-dc converter.

47 Claims, 3 Drawing Sheets

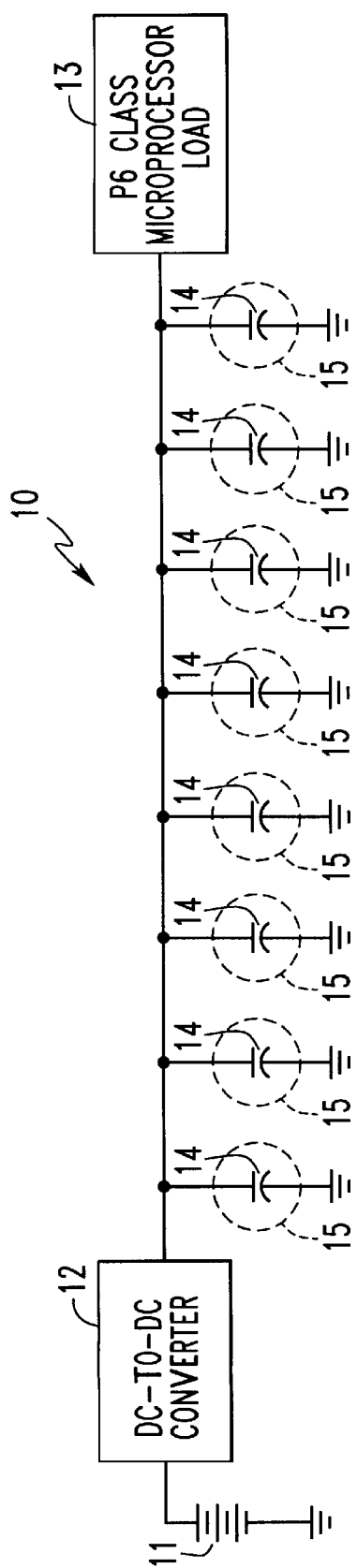
FIG. 1 *PRIOR ART*
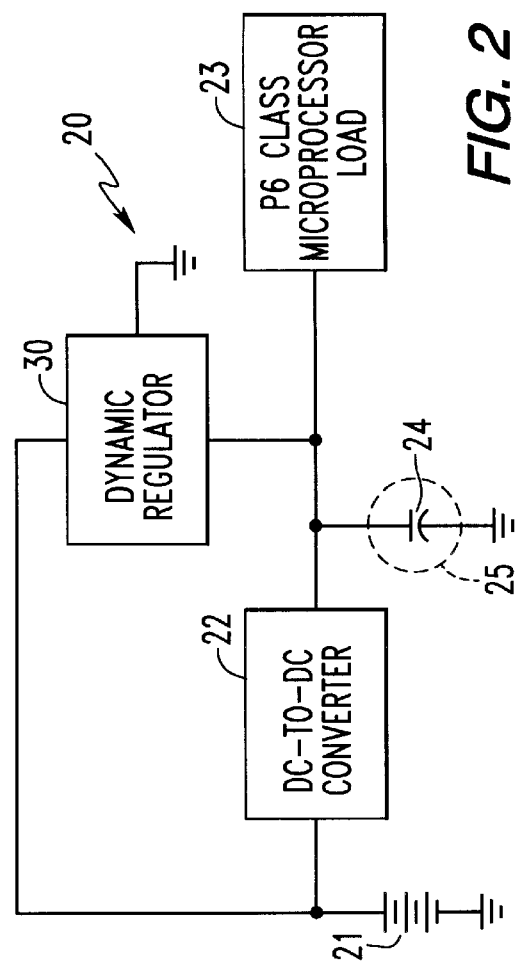
FIG. 2

DC-DC CONVERTER HAVING DYNAMIC REGULATOR WITH CURRENT SOURCING AND SINKING MEANS

FIELD OF THE INVENTION

The present invention relates to the field of electronics, and, more particularly, to dc-to-dc power converter and associated regulation components and circuits, such as for powering electronic devices.

BACKGROUND OF THE INVENTION

Dc-to-dc power converters are widely used to supply power to electronic devices, such as computers, printers, etc. Such dc-to-dc converters come in a variety of configurations for producing a desired output voltage from a source voltage. For example, a buck or step down power converter produces an output voltage that is less than the source voltage. A typical step down converter has high conversion efficiency, is relatively simple, and requires no output transformer.

A typical step down converter, such as including the HIP 5020 converter controller made by the assignee of the present invention, is a compact integrated circuit, has high efficiency, and is easy to use. The pulse width modulation (PWM) circuit of a typical dc-to-dc converter accepts a clock signal as an input along with a signal from an error amplifier. The error amplifier, in turn, controls switching on the output current and, thus, controls the current and voltage delivered to the load.

There are many commercial applications where a relatively low dc voltage in the range of 2 to 5 volts is desired, such as for powering a microprocessor. Turning to FIG. 1, a prior art circuit 10 is illustrated and includes a conventional dc-to-dc converter 12 connected to a load in the form of a P6 Class microprocessor 13. The converter 12 is supplied power from the illustrated rechargeable battery 11. Unfortunately, the P6 Class microprocessor 13 may generate relatively large transient currents. For example, in an effort for greater energy conservation, such a microprocessor will typically switch off unused circuit portions, such as when in a sleep mode. Switching off the circuits may generate large current excess transients. Moreover, when the microprocessor awakes from the sleep mode, large current demand transients on the order of 1 amp/nanosecond may be generated by the microprocessor 13.

A typical dc-to-dc converter 12 may take from 5 to 100 microseconds to build up current, in part, because of the relative slowness of the pulse width modulation control. As illustrated in FIG. 1, a relatively large number of expensive electrolytic capacitors 14, such as tantalum capacitors, are used to store charge and supply this current. In the illustrated embodiment, eight capacitors 14 are used. Besides being relatively expensive, the capacitors each may have a fairly large footprint 15 and volume, and thereby collectively take up valuable limited real estate within a notebook or other personal computer, for example.

SUMMARY OF THE INVENTION

In view of the foregoing background, it is therefore an object of the present invention to provide an electronic circuit and associated methods which reduce transients, and while reducing the need for relatively bulky and expensive passive capacitors which would otherwise be needed for reducing transients.

This and other objects, advantages and features of the present invention are provided by an electronic circuit comprising a dynamic regulator connected to the load and the dc-to-dc converter, and wherein the dynamic regulator comprises one or both of current sourcing means for actively sourcing current to the load during load current demand transients, and current sinking means for actively sinking current from the load during load current excess transients. More particularly, the current sourcing means may source current to the load during a relatively large load current demand transient to thereby reduce a load voltage transient dip which would otherwise occur. Conversely, the current sinking means actively sinks current from the load during load current excess transients to thereby reduce a load voltage spike which would otherwise occur.

The dynamic regulator preferably comprises voltage sensing means for sensing load voltage, and load voltage tracking means for tracking the load voltage. In one embodiment, the load voltage tracking means may be provided by a relatively straightforward resistor-capacitor network connected across the load.

The current sourcing means preferably includes a current source switch for sourcing current to the load, and current source control means for operating the current source switch responsive to the load voltage falling rapidly with respect to the tracked load voltage. In addition, the current source control means may be provided by first signal generating means for generating a first scaled tracking signal related to the tracked load voltage by a first factor, and a first comparator for operating the first current source switch responsive to the sensed voltage falling below the first scaled tracking signal.

In a similar fashion, the current sinking means may include a current sink switch for sinking current from the load, and current sink control means for operating the current sink switch responsive to the sensed load voltage quickly rising above the tracked load voltage. The current sink control means may be provided by second signal generating means for generating a second scaled tracking signal related to the tracked load voltage by the second factor, and a second comparator for operating the current sink switch responsive to the sensed load voltage rising above the second scaled tracking signal.

The R/C network described above may include a pair of resistors selectably connectable to define a faster or shorter time constant and a slower or longer time constant for tracking the load voltage. Accordingly, the dynamic regulator may further comprise time constant switching means for switching from the fast time constant to the slow time constant responsive to the sensed voltage rising above the second scaled tracking signal. Accordingly, the fast time constant is used to quickly follow any load ripple without triggering the current sourcing. Once the current sourcing is triggered it remains in effect based upon the second or slower time constant. The R/C network operates similarly for current sinking for a load current excess transient. In addition, the time constant can be readily switched by connecting two resistors in parallel for the fast time constant or operating with only one of the resistors in series with the capacitor for the slower time constant.

In one embodiment of the invention, the dc-to-dc converter comprises a first integrated circuit, and the dynamic regulator comprises a second integrated circuit. Of course, in other embodiments, both functions could be incorporated in the same integrated circuit. In any event, the dynamic regulation of the load voltage using the present invention permits a significant reduction in the number and/or size of capacitors typically required to reduce transients.

Accordingly, the cost is reduced, weight is reduced, and valuable real estate is conserved as highly desirable for many applications.

The present invention is also highly desirable for a load including a circuit having a sleep state drawing relatively little current, and an awakened state drawing relatively large current. For example, such a load may be a microprocessor. In addition, such a circuit may switch rapidly between states to cause the relatively large load current transients.

A method aspect of the present invention is for dynamically regulating an electronic circuit of a type comprising a dc-to-dc converter and a load connected thereto. The method preferably comprises the steps of sensing a load voltage, tracking the load voltage, and actively sourcing current during a load current demand transient based upon the sensed load voltage dropping with respect to the tracked load voltage, to thereby reduce a load voltage dip which would otherwise occur. The step of actively sourcing current preferably comprises operating a current source switch responsive to the sensed load voltage falling rapidly with respect to the tracked load voltage. The step of operating the current source switch may include: generating a first scaled tracking signal related to the tracked load voltage by a first factor, and operating the current source switch responsive to the sensed voltage falling below the first scaled tracking signal.

The step of tracking the load voltage preferably comprises tracking the load voltage at one of a fast time constant and a slow time constant. Accordingly, the method may further comprise the step of switching from the fast time constant to the slow time constant responsive to the sensed voltage falling below the first scaled tracking signal.

The load is also typically capable of generating a load current excess transient. Thus, the method may further include the step of actively sinking current during the load current excess transient based upon the sensed load voltage rising with respect to the tracked load voltage. The active current sinking will thereby reduce a load voltage spike which would otherwise occur. Moreover, the current sourcing/sinking permits a reduction in the number of expensive and relatively large capacitors that would otherwise be required to account for the load transients.

BRIEF DESCRIPTION OF THE DRAWINGS

FIG. 1 is a schematic block diagram of an electronic circuit as in the prior art and using a series of capacitors for accommodating load current transients.

FIG. 2 is a schematic block diagram of an electronic circuit using a dynamic regulator in accordance with the present invention.

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, applicants provide these embodiments so that this disclosure will be thorough and complete, and will fully convey the scope of the invention to those skilled in the art. Like numbers refer to like elements throughout.

Figure 3:
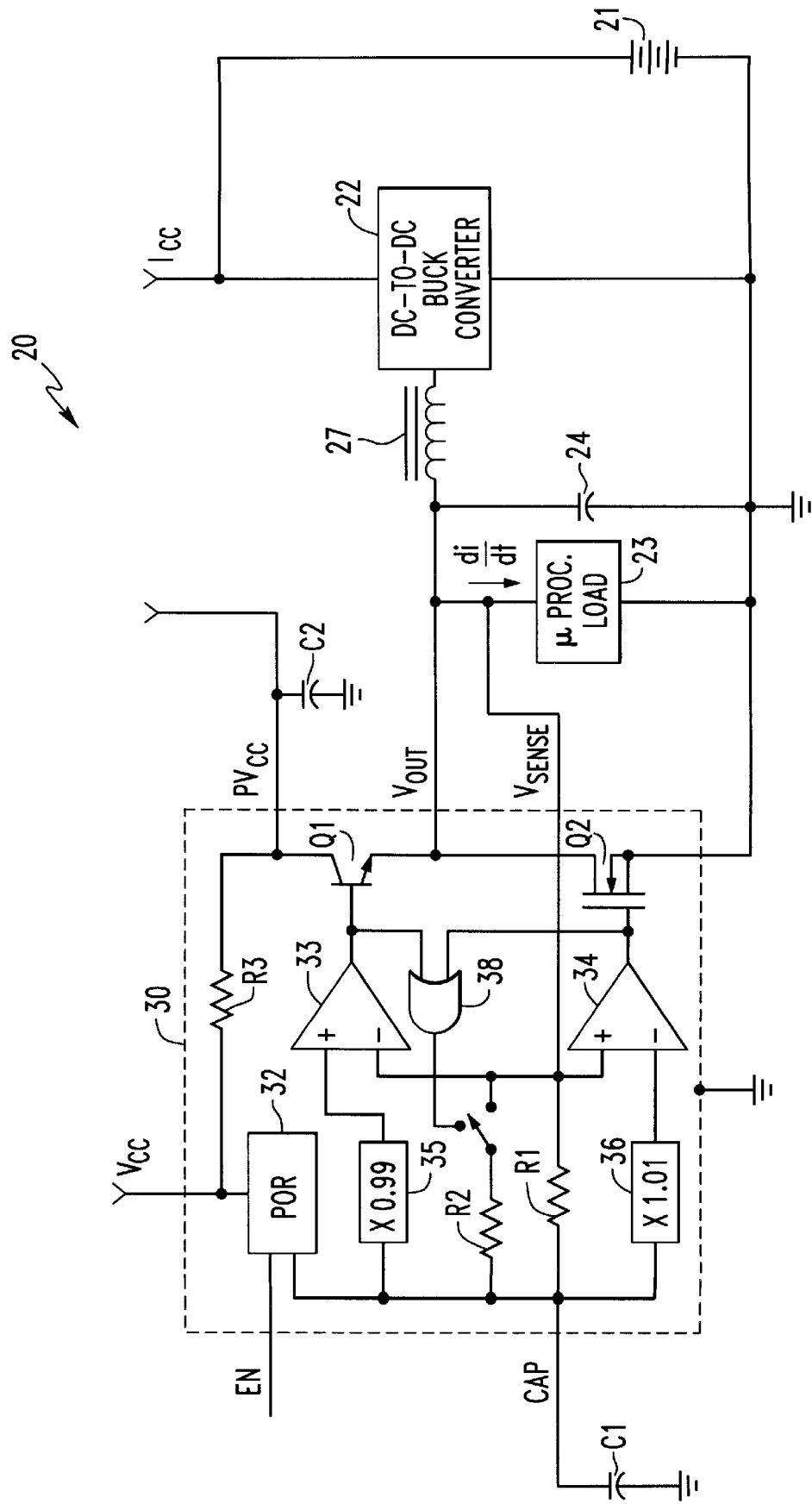
FIG. 3 is a schematic circuit diagram of the electronic circuit as shown in FIG. 2 with the dynamic regulator shown in greater detail.

Referring to FIGS. 2 and 3, the electronic circuit 20 in accordance with the present invention is first described. The circuit 20 includes a conventional buck or step-down dc-to-dc converter 22 connected to a power source, such as the illustrated rechargeable battery 21. The output terminals of the converter 22 are connected to the microprocessor load 23 through the illustrated inductor core 27 and capacitor 24. The converter 22 may be any of number of conventionally available types, such as including the HIP 5020 controller of the assignee of the present invention. The pulse width modulating and other associated functions of the dc-to-dc converter 22 may be readily implemented in an integrated circuit package for compactness and energy efficiency as would also be readily understood by those skilled in the art. The pulse width modulating dc-to-dc converter 22 may typically have difficulty following the relatively rapid transients of certain loads, such as microprocessor loads, without a relatively large number of electrolytic capacitors 24 as explained in the background of the invention. The details of operation of the converter 22 will be readily appreciated by those skilled in the art and need no further description herein.

The present invention is highly desirable for a microprocessor load 23 having a sleep state drawing relatively little current, and an awakened state drawing relatively large currents. When switching from the sleep state to the awakened state, the load 23 creates a load current demand transient wherein more current is demanded by the load than can be supplied by the converter 22. Conversely, when switching from the awakened state to the sleep state, the load requires less current than is being supplied by the converter. Accordingly, a load current excess transient is produced. In other words, such a microprocessor load 23 may switch rapidly between states to cause the relatively large load current transients. For example, the microprocessor load may be a P6 Class microprocessor as would be readily understood by those skilled in the art.

The dynamic regulator 30 of the present invention permits the number of capacitors 24, which are typically used to store and supply current for load induced transients, to be substantially reduced in the overall circuit 20. In the illustrated embodiment, only a single capacitor 24 with its associated footprint 25 is illustrated. Those of skill in the art will readily appreciate that other capacitor configurations are contemplated by the present invention, dependent upon the current transients (di/dt) to be expected, and the size of the available capacitors.

The dynamic regulator 30 may include one or both of current sourcing means for actively sourcing current to the load 23 during load current demand transients, and current sinking means for actively sinking current from the load also during load current excess transients. More particularly, the current sourcing means sources current to the load during a relatively large load current demand transient to thereby reduce a load voltage transient dip which would otherwise occur. Conversely, the current sinking means actively sinks current from the load during load current excess transients to thereby reduce a load voltage spike which would otherwise occur.

The dynamic regulator 30 is illustratively connected to the load 23 to sense the load voltage at $V_{sense}$, as well as provide current sourcing and sinking via $V_{out}$ as described in greater detail below. The dynamic regulator 30 also illustratively includes the power on reset (POR) circuit 32 connected to $V_{CC}$ and an enable input EN as would be readily understood by those skilled in the art. A biasing resistor R3 also illustratively connects the transistors Q1, Q2 to $V_{CC}$ as would also be readily understood by those skilled in the art. In the illustrated embodiment, power is supplied from $PV_{CC}$ to transistor Q1, and external capacitor C2 is also connected to $PV_{CC}$ as would also be understood by those skilled in the art.

One important portion and feature of the dynamic regulator 30 is the inclusion of load voltage tracking means for tracking the load voltage. In one preferred embodiment, the load voltage tracking means may be provided in a relatively straightforward fashion by the illustrated resistor-capacitor network connected across the load 23. In the illustrated embodiment, the resistor-capacitor network is provided by a pair of resistors R1, R2 and the externally connected capacitor C1 connected at terminal CAP. In one example, the resistor R1 may be 500 Ohms, the resistor R2 may be 50 Ohms, and the capacitor C1 may be 0.1 $\mu F$. The second resistor R2 may be selectably connected in parallel with the first resistor R1 to reduce the effective resistance and thereby reduce the time constant, as is explained in greater detail below. With only the first resistor R1 in the circuit, the time constant is longer as also further explained below.

The resistor-capacitor network tracks, or follows an average load voltage so that gradual changes in load voltage and/or a ripple voltage, do not unnecessarily trigger operation of the dynamic regulator 30, but instead the dynamic regulator operates only on relatively steep and short duration transients. As would be readily understood by those skilled in the art, the ripple may become more pronounced at lower load currents. The resistor-capacitor network also allows the dynamic regulator 30 to be used with a variety of converters 22 having different operating voltages.

The current sourcing means preferably includes a current source switch for sourcing current to the load, and current source control means for operating the current source switch responsive to the load voltage falling below the tracked load voltage. In the illustrated embodiment, the current source switch is provided by the bipolar transistor Q1. Those of skill in the art will recognize that a single or multiple transistors may be used, and that the transistor(s) may be a field-effect transistor in other embodiments.

The current source control means may be provided by first signal generating means for generating a first scaled tracking signal related to the tracked load voltage by a first scaling factor, and a first comparator 33 for operating the first current source switch Q1 responsive to comparing the first scaled tracking signal to the sensed load voltage. In the illustrated embodiment, the first tracking signal is generated by scaling the tracked voltage signal by 0.99 in the schematically illustrated multiplier 35. Accordingly, if the actual or sensed load voltage drops sharply by one percent from the average tracked load voltage, the comparator 33 causes the switching transistor Q1 to turn on and thereby rapidly supply current to the load 23. Accordingly, the output voltage is prevented from sharply dipping. In addition, the logic gate 38 also causes the time constant of the resistor-capacitor network to be extended by disconnecting the second resistor R2 so that the current sourcing continues until the transient is sufficiently compensated. After the current sourcing is no longer needed, the logic gate 38 will cause the time constant to return to the shorter or faster value by reconnecting resistor R2 in parallel with resistor R1.

In a similar fashion, the current sinking means may include a current sink switch, as provided by transistor Q2 for sinking current from the load 23, and current sink control means for operating the current sink switch responsive to the sensed load voltage rising quickly above the tracked load voltage. As would be readily understood by those skilled in the art, the term "sinking current from the load" includes sinking current delivered to the load from the dc-to-dc converter which may be relatively slow to change its output current. In the illustrated embodiment, the current sink switch is a field-effect transistor Q2. Those of skill in the art will recognize that a single or multiple transistors may be used, and that the transistor(s) may be a bipolar transistor in other embodiments.

The current sink control means may be provided by second signal generating means for generating a second scaled tracking signal related to the average load voltage by a second scaling factor, and a second comparator 34 for operating the current sink switching transistor Q2 responsive to the sensed load voltage rising above the second scaled tracked load voltage. In the illustrated embodiment, the second signal is generated by scaling the average voltage signal by 1.01 in the schematically illustrated multiplier 36. Accordingly, if the actual load voltage rises sharply by one percent from the average or tracked load voltage, the comparator 34 causes the switching transistor Q2 to turn on and rapidly sink current from the load 23. The second comparator 34 also causes the time constant to become longer so that the current sinking continues to adequately compensate for the load current excess transient.

Of course, scaling values may be used rather than 0.99 and 1.01 depending on the desired regulation, and as would be readily understood by those skilled in the art. In addition, although both current sourcing and sinking are shown in the illustrated embodiment, other embodiments of the invention may include only current sourcing, or current sinking as would also be readily understood by those skilled in the art. The combination of both current sourcing and sinking for dynamic regulation may be desired particularly for significantly reducing the number of bulky and expensive passive capacitors which would otherwise be needed for reducing transients caused by rapid changes in current demanded by the load 23.

In the illustrated embodiment of the circuit 20, the dc-to-dc converter 22 is a first integrated circuit, and the dynamic regulator 30 is a second integrated circuit. Of course, in other embodiments, both functions could be incorporated in the same integrated circuit. In other embodiments, the circuit could be implemented using one or more discrete components as would be readily appreciated by those skilled in the art. In any event the dynamic regulation of the load voltage using the present invention permits a significant reduction in the number or size of capacitors typically required to reduce transients. Accordingly, the cost is reduced, weight is reduced, and valuable real estate conserved as is highly desirable for many applications.

A method aspect of the present invention is for dynamically regulating an electronic circuit 20 of a type comprising a dc-to-dc converter 22 and a load 23 connected thereto. In one embodiment, the method preferably comprises the steps of sensing the load voltage, tracking the load voltage, and operating a current source switch Q1 to source current to the load responsive to the sensed load voltage falling below the tracked load voltage to actively source current to the load during a relatively large load current demand transient and thereby reduce a load voltage transient dip which would otherwise occur. The step of operating the current source switch may include the steps of generating a first scaled tracking signal related to the average load voltage by a first factor, and operating the current source switch Q1,Q2 responsive to the sensed load voltage falling below the first scaled tracking signal.

In another embodiment of the invention, the method may include operating a current sink switch Q2 responsive to the sensed load voltage rising above the tracked load voltage to actively sink current from the load during a relatively large load excess current transient and thereby reduce a load voltage transient spike which would otherwise occur. The step of operating the current sink switch preferably comprises the steps of generating a second scaled tracking signal related to the tracked load voltage by a second factor, and operating the current sink switch responsive to the sensed load voltage rising above the second scaled tracking signal. Of course, in other embodiments the steps of operating the current source and sink switches may be combined.

EXAMPLE

The following example is included for purposes of illustration only and is not limiting of the invention.

Figure 4:
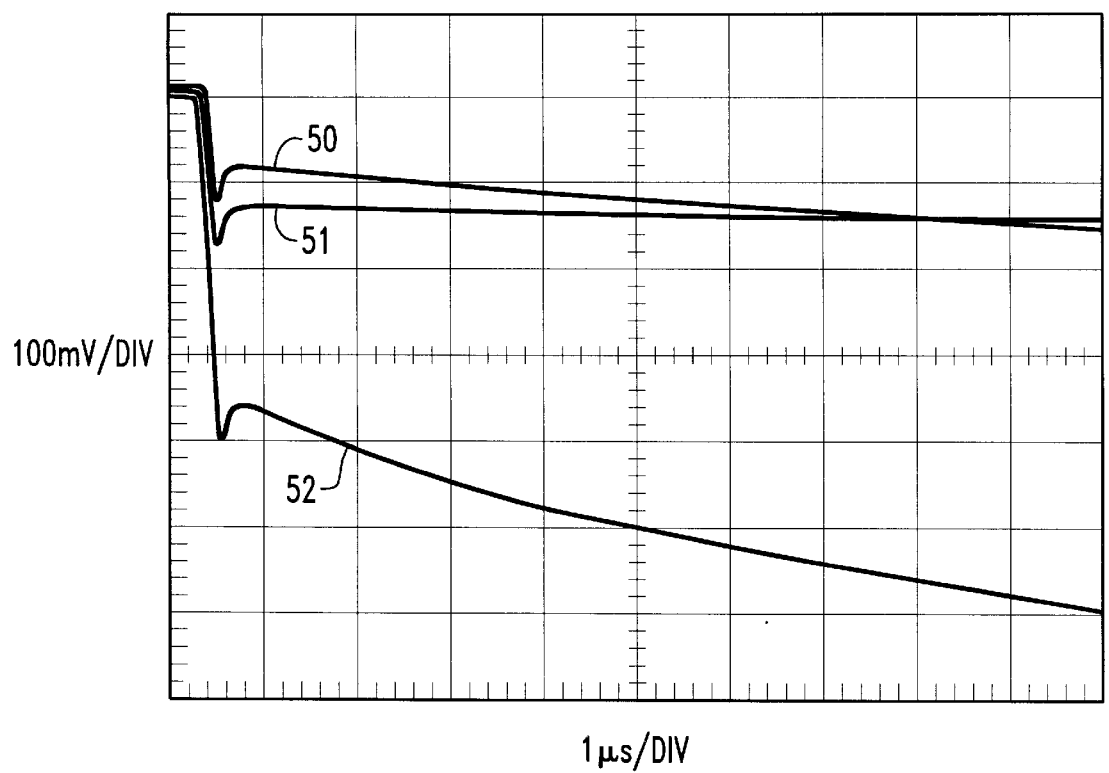
FIG. 4 is a graph of the voltage output using the present invention and various combinations of capacitors as described in the Example.

Turning now additionally to the graph of FIG. 4, a comparative example of operation of the circuit 20 including the dynamic regulator 30 is further explained. In the graph, three plots of various operating conditions are illustrated. For each a high impedance power source was connected to a transient load. The transient load provided a four amp step increase over a period of 200 nanoseconds. For the plot labelled 50, only four tantalum capacitors of 220 $\mu$F were connected to the load and high impedance source. For the plot labelled 51, only a single 220 $\mu$F capacitor was used in conjunction with the dynamic regulator 30 of the invention. For further illustrative purposes, the plot labelled 52 shows the output voltage with only a single 220 $\mu$F capacitor.

The performance of the dynamic regulator 30 and a single 220 $\mu$F capacitor is about equal to that of the four capacitor conventional circuit. In other words, the dynamic regulator 30 of the present invention eliminated the need for three relatively large and expensive capacitors.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. An electronic circuit comprising:
  a dc-to-dc converter and a load connected thereto, said load being capable of generating a load current demand transient and a load current excess transient; and
  a dynamic regulator connected in parallel with said load and said dc-to-dc convertor and comprising:
    current sourcing means for actively sourcing current during the load current demand transient to thereby reduce a load voltage dip which would otherwise occur,
    current sinking means for actively sinking current during the load current excess transient to thereby reduce a load voltage spike which would otherwise occur,
    voltage sensing means for sensing a load voltage,
    load voltage tracking means for tracking the load voltage by following an average load voltage, and
    control means for operating at least one of said current sourcing means and said current sinking means responsive to the sensed load voltage changing rapidly with respect to the tracked load voltage so that other changes in the sensed load voltage do not trigger operation of a respective one of said current sourcing means and said current sinking means.

2. An electronic circuit according to claim 1 wherein said current sourcing means comprises:
  a current source switch; and
  wherein said control means comprises current source control means for operating said current source switch responsive to a sensed load voltage falling rapidly.

3. An electronic circuit according to claim 2 wherein said current source switch comprises at least one transistor.

4. An electronic circuit according to claim 2 wherein said current source control means comprises:
  first signal generating means for generating a first scaled tracking signal related to the tracked load voltage by a first factor; and
  a first comparator for operating said current source switch responsive to the sensed load voltage falling below the first scaled tracking signal.

5. An electronic circuit according to claim 4 wherein said load voltage tracking means operates according to one of a fast time constant and a slow time constant; and further comprising time constant switching means for switching from the fast time constant to the slow time constant responsive to the sensed voltage falling below the first scaled tracking signal.

6. An electronic circuit according to claim 5 wherein said load voltage tracking means comprises a resistor-capacitor network connected to said load.

7. An electronic circuit according to claim 6 wherein said resistor-capacitor network comprises a pair of resistors and a capacitor connected thereto; wherein said pair of resistors is connected in parallel with said capacitor for the fast time constant and only one of said resistors is connected to said capacitor for the slow time constant; and wherein said time constant switching means comprises logic means associated with an output of said first comparator for effecting switching of said pair of resistors.

8. An electronic circuit according to claim 1 wherein said current sinking means comprises:
  a current sink switch for sinking current; and
  wherein said control means comprises current sink control means for operating said current sink switch responsive to a sensed load voltage rising rapidly.

9. An electronic circuit according to claim 8 wherein said current sink switch comprises at least one transistor.

10. An electronic circuit according to claim 8 wherein said current sink control means comprises:
  second signal generating means for generating a second scaled tracking signal related to the tracked load voltage by a second factor; and
  a second comparator for operating said current sink switch responsive to the sensed load voltage rising above the second scaled tracking signal.

11. An electronic circuit according to claim 10 wherein said load voltage tracking means operates according to one of a fast time constant and a slow time constant; and further comprising time constant switching means for switching from the fast time constant to the slow time constant responsive to the sensed load voltage rising above the second scaled tracking signal.

12. An electronic circuit according to claim 11 wherein said load voltage tracking means comprises a resistor-capacitor network connected to said load.

13. An electronic circuit according to claim 12 wherein said resistor-capacitor network comprises a pair of resistors and a capacitor connected thereto; wherein said pair of resistors is connected in parallel with said capacitor for the fast time constant and only one of said resistors is connected to said capacitor for the slow time constant; and wherein said time constant switching means comprises logic means associated with an output of said second comparator for effecting switching of said pair of resistors.

14. An electronic circuit according to claim 1 wherein said load comprises a circuit having a sleep state drawing relatively little current, and an awakened state drawing relatively large current; wherein said load generates the load current demand transient responsive to switching from the sleep state to the awakened state; and wherein said load generates the current excess transient responsive to switching from the awakened state to the sleep state.

15. An electronic circuit according to claim 1 wherein said load comprises a microprocessor.

16. An electronic circuit according to claim 1 wherein said dc-to-dc converter comprises a first integrated circuit; and wherein said dynamic regulator comprises a second integrated circuit.

17. An electronic circuit according to claim 1 wherein said dc-to-dc converter comprises a step-down dc-to-dc converter.

18. A dynamic regulator for parallel connection to a load and a dc-to-dc converter connected thereto, the load being capable of generating a load current demand transient, said dynamic regulator comprising;

voltage sensing means for sensing a load voltage;

load voltage tracking means for tracking the load voltage by following an average load voltage;

current sourcing means for actively sourcing current during a load current demand transient to thereby reduce a load voltage dip which would otherwise occur; and current source control means for operating said current sourcing means responsive to the sensed load voltage falling rapidly with respect to the tracked load voltage so that other changes in the sensed load voltage do not trigger operation of said current sourcing means.

19. A dynamic regulator according to claim 18 wherein said current sourcing means comprises a current source switch.

20. A dynamic regulator according to claim 19 wherein said current source control means comprises:

first signal generating means for generating a first scaled tracking signal related to the tracked load voltage by a first factor; and a first comparator for operating said current source switch responsive to the sensed load voltage falling below the first scaled tracking signal.

21. A dynamic regulator according to claim 20 wherein said load voltage tracking means operates according to one of a fast time constant and a slow time constant; and further comprising time constant switching means for switching from the fast time constant to the slow time constant responsive to the sensed load voltage falling below the first scaled tracking signal.

22. A dynamic regulator according to claim 21 wherein said load voltage tracking means comprises a resistor-capacitor network connected to the load.

23. A dynamic regulator according to claim 21 wherein said resistor-capacitor network comprises a pair of resistors and a capacitor connected thereto; wherein said pair of resistors is connected in parallel with said capacitor for the fast time constant and only one of said resistors is connected to said capacitor for the slow time constant; and wherein said time constant switching means comprises logic means associated with an output of said first comparator for effecting switching of said pair of resistors.

24. A dynamic regulator according to claim 18 wherein the load is further capable of generating a load current excess transient; and further comprising current sinking means for actively sinking current during the load current excess transient based upon the sensed load voltage rising with respect to the tracked load voltage, to thereby reduce a load voltage spike which would otherwise occur.

25. A dynamic regulator according to claim 24 wherein said current sinking means comprises:

a current sink switch; and current sink control means for operating said current sink switch responsive to the sensed load voltage rising rapidly with respect to the tracked load voltage.

26. A dynamic regulator according to claim 25 wherein said current sink control means comprises:

second signal generating means for generating a second scaled tracking signal related to the tracked load voltage by a second factor; and a second comparator for operating said current source switch responsive to the sensed load voltage rising above the second scaled tracking signal.

27. A dynamic regulator according to claim 26 wherein said load voltage tracking means operates according to one of a fast time constant and a slow time constant; and further comprising time constant switching means for switching from the fast time constant to the slow time constant responsive to the sensed load voltage rising above the second scaled tracking signal.

28. A dynamic regulator according to claim 27 wherein said load voltage tracking means comprises a resistor-capacitor network connected to the load.

29. A dynamic regulator according to claim 27 wherein said resistor-capacitor network comprises a pair of resistors and a capacitor connected thereto; wherein said pair of resistors are connected in parallel with said capacitor for the fast time constant and only one of said resistors is connected to said capacitor for the slow time constant; and wherein said time constant switching means comprises logic means associated with an output of said second comparator for effecting switching of said pair of resistors.

30. A dynamic regulator for parallel connection to a load and a dc-to-dc converter connected thereto, the load being capable of generating a load current excess transient, said dynamic regulator comprising:

voltage sensing means for sensing a load voltage;

load voltage tracking means for tracking the load voltage by following an average load voltage;

current sinking means for actively sinking current during a load current excess transient to thereby reduce a load voltage spike which would otherwise occur; and current sink control means for operating said current sinking means responsive to the sensed load voltage rising rapidly with respect to the tracked load voltage so that other changes in the sensed load voltage do not trigger operation of said current sinking means.

31. A dynamic regulator according to claim 30 wherein said current sinking means comprises a current sink switch.

32. A dynamic regulator according to claim 31 wherein said current sink control means comprises:

second signal generating means for generating a second scaled tracking signal related to the tracked load voltage by a second factor; and a second comparator for operating said current source switch responsive to the sensed load voltage rising above the second scaled tracking signal.

33. A dynamic regulator according to claim 32 wherein said load voltage tracking means operates according to one of a fast time constant and a slow time constant; and further comprising time constant switching means for switching from the fast time constant to the slow time constant responsive to the sensed load voltage rising above the second scaled tracking signal.

34. A dynamic regulator according to claim 33 wherein said load voltage tracking means comprises a resistor-capacitor network connected to the load.

35. A dynamic regulator according to claim 33 wherein said resistor-capacitor network comprises a pair of resistors and a capacitor connected thereto; wherein said pair of resistors is connected in parallel with said capacitor for the fast time constant and only one of said resistors is connected to said capacitor for the slow time constant; and wherein said time constant switching means comprises logic means associated with an output of said second comparator for effecting switching of said pair of resistors.

36. A method for controlling transients in an electronic circuit comprising a load and a dc-to-dc converter connected thereto, the load being capable of generating a load current demand transient, the method comprising the steps of:

sensing a load voltage;

tracking the load voltage by following an average load voltage; and actively sourcing current during a load current demand transient responsive to the sensed load voltage falling rapidly with respect to the tracked load voltage, to thereby reduce a load voltage dip which would otherwise occur and so that other changes in the sensed load voltage do not trigger actively sourcing current.

37. A method according to claim 36 wherein the step of actively sourcing current comprises operating a current source switch.

38. A method according to claim 37 wherein the step of operating the current source switch comprises:

generating a first scaled tracking signal related to the tracked load voltage by a first factor; and operating the current source switch responsive to the sensed load voltage falling below the first scaled tracking signal.

39. A method according to claim 38 wherein the step of tracking the load voltage comprises tracking the load voltage at one of a fast time constant and a slow time constant; and further comprising the step of switching from the fast time constant to the slow time constant responsive to the sensed load voltage falling below the first scaled tracking signal.

40. A method according to claim 36 wherein the load is further capable of generating a load current excess transient; and further comprising the step of actively sinking current during the load current excess transient responsive to the sensed load voltage rising rapidly with respect to the tracked load voltage, to thereby reduce a load voltage spike which would otherwise occur and so that other changes in the sensed load voltage do not trigger actively sinking current.

41. A method according to claim 40 wherein the step of current sinking comprises operating a current sink switch.

42. A method according to claim 40 wherein the step of operating the current sink switch comprises:

generating a second scaled tracking signal related to the tracked load voltage by a second factor; and operating the current source switch responsive to the sensed load voltage rising above the second scaled tracking signal.

43. A method according to claim 42 wherein the step of tracking the load voltage comprises tracking the load voltage according to one of a fast time constant and a slow time constant; and further comprising the step of switching from the fast time constant to the slow time constant responsive to the sensed load voltage rising above the second scaled tracking signal.

44. A method for controlling transients in an electronic circuit comprising a load and a dc-to-dc converter connected thereto, the load being capable of generating a load current excess transient, the method comprising the steps of:

sensing a load voltage;

tracking the load voltage by following an average load voltage; and actively sinking current during the load current excess transient responsive to the sensed load voltage rising rapidly with respect to the tracked load voltage, to thereby reduce a load voltage spike which would otherwise occur and so that other changes in the sensed load voltage do not trigger active current sinking.

45. A method according to claim 44 wherein the step of current sinking comprises operating a current sink switch.

46. A method according to claim 45 wherein the step of operating the current sink switch comprises:

generating a second scaled tracking signal related to the tracked load voltage by a second factor; and operating the current source switch responsive to the sensed load voltage rising above the second scaled tracking signal.

47. A method according to claim 46 wherein the step of tracking the load voltage comprises tracking the load voltage according to one of a fast time constant and a slow time constant; and further comprising the step of switching from the fast time constant to the slow time constant responsive to the sensed load voltage rising above the second scaled tracking signal.

* * * * *